Nov. 3, 1942.  K. W. COUSE  2,301,019
ROLLING RING WORKSTAND
Filed Jan. 13, 1940  2 Sheets-Sheet 2
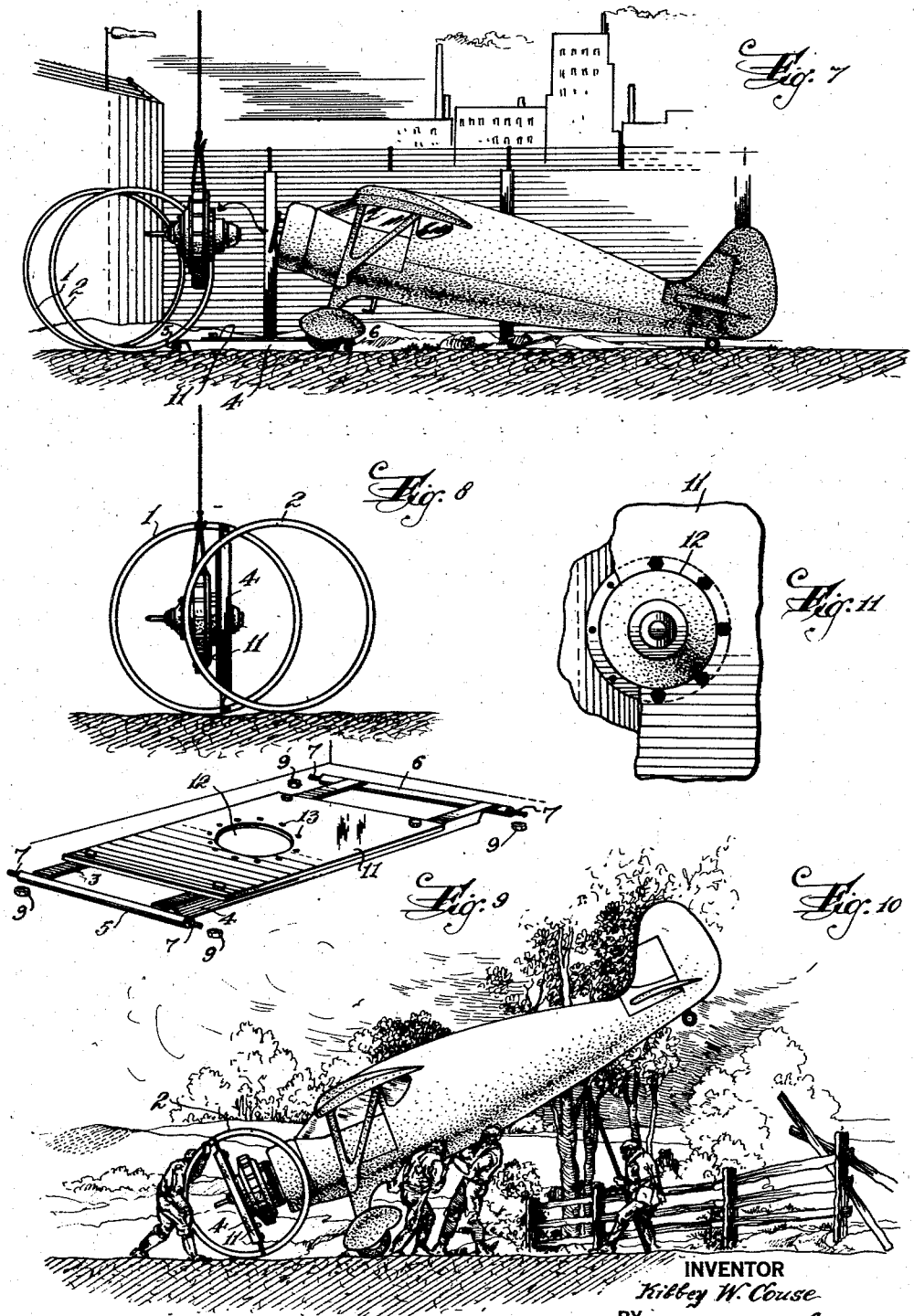
INVENTOR
Kilbey W. Couse
BY
A. D. T. Libby
ATTORNEY Patented Nov. 3, 1942

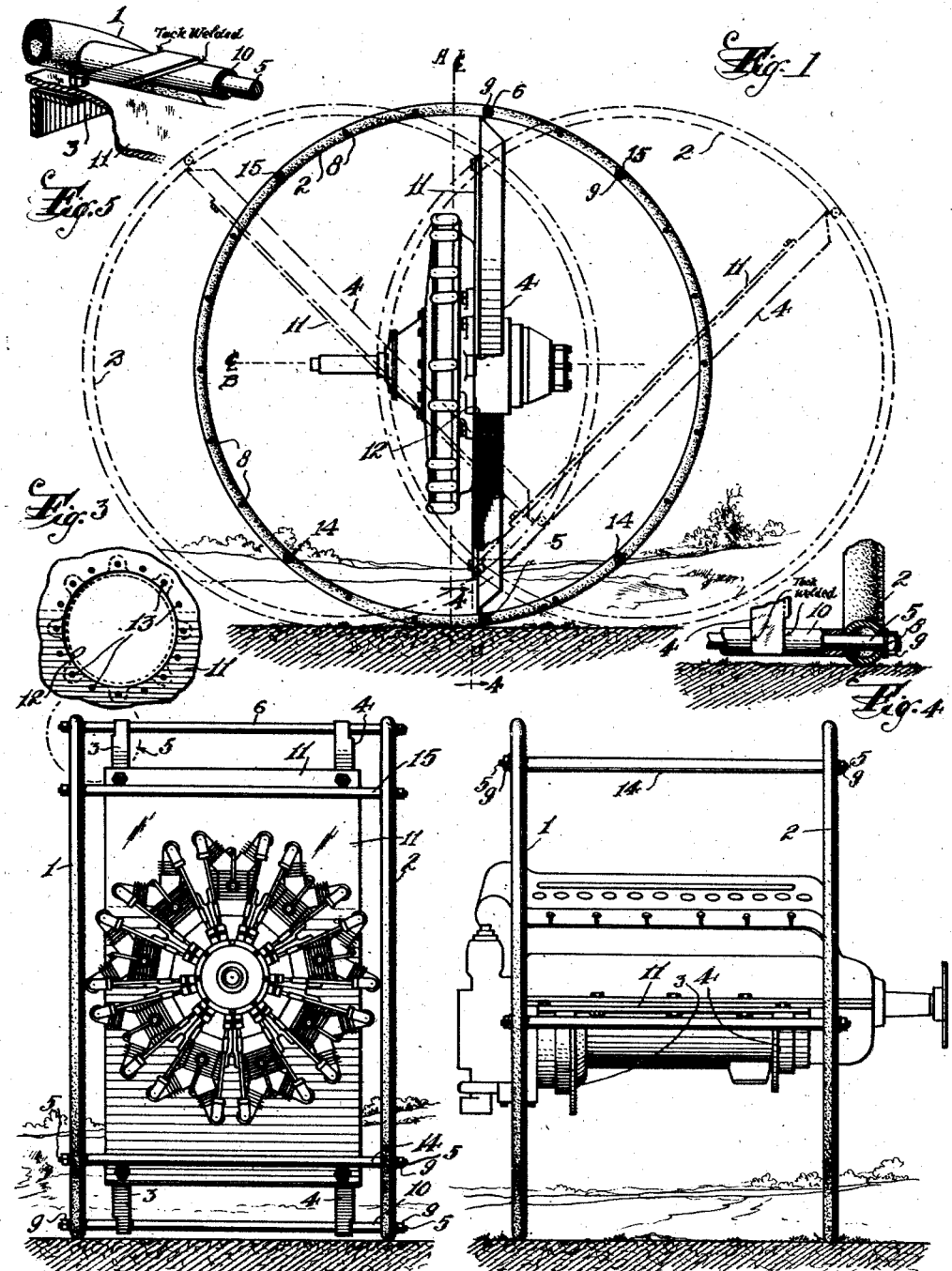

2,301,019

UNITED STATES PATENT OFFICE 2,301,019

ROLLING RING WORK STAND

Kibbey W. Couse, Newark, N. J.

Application January 13, 1940, Serial No. 313,707

2 Claims. (Cl. 29—89)

This invention relates to what I believe to be an entirely new type of workstand particularly adapted for use in servicing automotive vehicles in the field, and especially aeroplanes, whose engines are mounted on the forward part of the plane.

During the progress of an aeroplane engine through the factory it is the practice to provide a platform truck having small rollers or casters for moving the engine around throughout its stages of testing, inspection, etc. Such movable tables or stands cannot be used in the field where the ground may be rough, muddy, covered with snow and ice, etc.

Aeroplane engines, because of their construction, especially those of the radial type, require very careful handling to avoid injury to them during the transfer operation from the plane to the workshop or to a field service station.

It is therefore the principal object of my invention to provide a workstand which can be used for servicing aeroplane engines as well as other types of internal combustion engines in the field.

Other and further ancillary objects will be apparent to one skilled in this art, after a study of the specification taken in connection with the annexed drawings, wherein:

Figure 1 is a side view of my new type of rolling ring workstand, showing a radial engine mounted thereon, two positions of movement being indicated in dotted lines.

Figure 2 is a view of Figure 1 looking from left to right.

Figure 3 is a view taken at the central part of the support means for receiving the engine, showing in dotted lines the position which the lugs on the engine will take when the engine is mounted on the plate.

Figure 4 is a view on the line 4—4 of Figure 1.

Figure 5 is a perspective view around the broken line 5 of Figure 2.

Figure 6 is a view similar to Figure 2 but showing the engine having its cylinders in line.

Figure 7 is a view showing the use of a crane for lifting the engine off the plane so it may be fastened to the rolling workstand.

Figure 8 is a view similar to the left-hand end of Figure 7, but in position of assembly of the engine to the stand.

Figure 9 is a perspective view of the support plate of the workstand on which the engine is mounted.

Figure 10 is a view indicating the direct application of the workstand to an aeroplane engine where there is no crane available.

Figure 11 is a fragmentary plan view showing the forward end of the engine mounting shown in Figure 10 inserted in the support plate.

In the different views, wherein like numbers refer to corresponding parts, the workstand is made of a pair of metal rings 1 and 2 preferably of strong steel tubes, the ends of which are welded together after the tube has been formed into a ring. As a practical device for handling aircraft engines, I have secured excellent results by making the rings 1 and 2 approximately six feet in diameter and spaced about four feet apart. The rings are held in this spaced position by engine-supporting means comprising a pair of angle or channel iron members 3 and 4 which are welded to the cross-rods 5 and 6, the ends of which are threaded at 7 to pass through transverse holes 8 which pass through the rings 1 and 2. Nuts 9 and lock washers, if necessary, are used to hold the cross-rods 5 and 6 securely to the rings 1 and 2.

As shown in Figure 4, the cross-rod may be all in one piece or it may comprise a bolt 5 and a metal sleeve 10 to which the members 3 and 4 are welded; so where I refer, in the claims, to the "bolts and associated parts," this is to be taken to mean the nuts, washers, sleeves, etc., which comprise the cross-members anchoring the rings 1 and 2 together. The members 3 and 4 carry a metal plate 11 preferably of steel, of a suitable thickness, having a central orifice 12 therein to receive the flange of the engine, which flange is used to mount the engine to the aeroplane. Bolt holes 13 are provided to correspond with the bolt holes in the flange of the engine.

Where a crane is available, either at the hangar or through the medium of a mobile repair shop as shown in Figure 4 of my Design Patent D-109,942, issued May 31, 1938, the engine may be attached to the crane and its holding bolts to the aircraft removed and swung to the position shown in Figures 7 and 8, and fastened to the plate 11, it being understood that the plate 11 is so positioned through the medium of the holes 8 in the rings 1 and 2 that its center of gravity is close to the axial center of the workstand. When the engine is so mounted as indicated in Figures 1 and 2, it may be rolled to any position as indicated by the dotted line in Figure 1, for the purpose of getting very easy access to the parts requiring attention; or the engine may be rolled on the workstand to any desired place or shelter, or even onto the rear platform of the traveling workshop (see Figure 4) of my patent previously referred to, for transportation to some other point if this be found desirable or necessary. Also, if necessary, additional brace rods 14 and 15 may be applied to the rings 1 and 2, preferably after the engine has been mounted thereon as heretofore described.

Since the support plate for the engine is adjustable—by that I mean adjustable in position with respect to the rings through the medium of the holes 8 in the rings—the center of gravity may be brought near the axial center of the workstand as heretofore explained, whereby the stand may be rolled very easily, even with a heavy engine mounted on the support; and due to the large diameter of the rings, this rolling movement may be carried out over very rough or muddy ground, or through a considerable depth of snow.

Where no crane or moving workshop is available, the aeroplane may be tilted up on its nose end, as indicated in Figure 10. The support plate 11 is then attached to the nose of the engine, passing the projecting portion thereof through the hole 12 and passing bolts through the holes 13 into the engine, it being understood that sufficient holes 13 are provided in the support plate 11 to accommodate at least some of the bolts or studs on the nose of the engine. After the support plate 11 is attached, the rings 1 and 2 are rolled into place, as they may be in Figures 7 and 8, and the attachment made between the support plate 11 and the rings 1 and 2, following which the bolts holding the engine to the aeroplane may be removed and the engine rolled to any position for work thereon, or to some place to which reference has heretofore been made.

In Figure 6 I have shown how a straight-in-line engine may be carried by the same rolling workstand, except the supporting means will be somewhat different from that shown in Figure 10, as the crank case of the engine extends down below what would be the plane of the plate 11; so this type of engine would be mounted by arms directly carried by the cross-bolts positioned in the holes 8 of the rings 1 and 2, in accordance with the type of engine being serviced.

While I have shown, in Figure 2, a radial type engine positioned within the boundaries of the rings 1 and 2, yet for engines of a size which may be larger than the rolling workstand available, the engine may project beyond the rings 1 and 2 as indicated in Figure 6. Thus one size of rolling stand will take care of substantially all aircraft engines being made today, but of course it is obvious that different sizes of rolling stands may be made to meet various conditions which may arise. Hence, it is of course possible to vary the details of the construction considerably, without departing from the spirit of my invention or the scope of the appended claims.

What I claim is:

1. A rolling ring workstand for internal combustion engines particularly of the type used in aeroplanes comprising a pair of strong tubular metallic rings of relative large diameter on which the whole workstand rolls, means for holding the rings in spaced position great enough so an engine may pass between them, and a support plate adapted to be first fastened to en engine before the same is removed from the plane and then fastened to the rings when they are rolled into position across the plane of the engine.

2. A "knock-down" workstand for an internal combustion engine especially of the radial aeroplane type comprising a support plate adapted to be fastened to an engine before the same is removed from the plane, and a pair of rings for running on the ground or a floor each of which may be independently rolled into position on opposite ends of said support plate, and means for fastening the said plate to the rings.

KIBBEY W. COUSE.